United States Patent
Taylor et al.

(10) Patent No.: US 7,209,452 B2
(45) Date of Patent: *Apr. 24, 2007

(54) METHOD AND SYSTEM FOR RETRIEVING LINK MANAGEMENT INTERFACE STATUS FOR A LOGICAL PORT

(75) Inventors: William Scott Taylor, Duluth, GA (US); David E. Massengill, Covington, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 979 days.

This patent is subject to a terminal disclaimer.

(21) Appl. No.: 10/318,540

(22) Filed: Dec. 13, 2002

(65) Prior Publication Data

US 2004/0114525 A1    Jun. 17, 2004

(51) Int. Cl.
*G01R 31/08* (2006.01)

(52) U.S. Cl. .................................. 370/241; 370/395.1
(58) Field of Classification Search .................. None
See application file for complete search history.

(56) References Cited

U.S. PATENT DOCUMENTS

2002/0168054 A1* 11/2002 Klos et al. .................. 379/1.04
2003/0189919 A1* 10/2003 Gupta et al. ................ 370/351

* cited by examiner

*Primary Examiner*—Duc Ho
(74) *Attorney, Agent, or Firm*—Merchant & Gould

(57) ABSTRACT

Systems and methods for obtaining logical layer information in a frame relay and/or asynchronous transfer mode (ATM) network are described. In an exemplary embodiment, a physical layer test system, such as an integrated testing and analysis system, communicates with a broadband network management system, which in turn communicates with an element management system for a frame relay and/or ATM network.

20 Claims, 9 Drawing Sheets

METHOD AND SYSTEM FOR RETRIEVING LINK MANAGEMENT INTERFACE STATUS FOR A LOGICAL PORT

CROSS-REFERENCE TO RELATED APPLICATIONS

This application relates to U.S. application Ser. No. 10/318,932, filed simultaneously, entitled "Method and System for Obtaining a Network Map," which is incorporated herein by reference. This application relates to U.S. application Ser. No. 10/318,467, filed simultaneously, entitled "Method and System for Obtaining a Permanent Virtual Circuit Map," which is incorporated herein by reference. This application relates to U.S. appliication Ser. No. 10/318,991, filed simultaneously, entitled "Method and System for Performing a Logical Loopback Test," which is incorporated herein by reference.

FIELD OF THE INVENTION

The present invention generally relates to logical layer testing in a telecommunications network. The present invention more particularly relates to methods and systems for obtaining logical layer information using a remote physical layer testing device.

BACKGROUND OF THE INVENTION

According to Vertical Systems Group, customer installations of carrier-based frame relay services in 1991 consisted of 120 ports worldwide. By 2001, the number of ports had increased to approximately 1.78 million. Providers often route frame relay services over asynchronous transfer mode (ATM) backbones. According to the ATM Forum (www.atmforum.com), approximately eighty percent of the world's telecommunications service providers use ATM in the core of their networks. As the number of customer and network installations has increased, so has the difficulty of effectively and efficiently monitoring and managing the networks supporting the providers' customers.

Communication through frame relay or ATM networks occurs within a logical path called a virtual circuit. The virtual circuit may be a permanent or switched virtual circuit. Out of the frame relay or ATM network, there are physical circuits that eventually connect to customer premises equipment (CPE) or the like. When a problem within a network arises, most of the Regional Bell Operating Companies (RBOCs) use well known out-of-the-box solutions to perform remote physical layer testing in an attempt to determine the source of the problem. Such out-of-the-box solutions perform physical layer tests remotely by sending a command to a network element and receiving a response, and, based on the response from the network element, creating a loop to test the physical circuit and determine whether it is working properly or not. However, in creating and testing a loop between points A and B, there is no way to determine what is occurring at the logical layer. Thus, if the network problem is in the logical portion of the frame relay or ATM network, physical layer testing cannot determine where the problem lies.

Presently, no cost effective remote logical layer testing solutions exist. Logical layer testing generally requires connecting a logical test box to a physical circuit to determine logical layer information. For example, several companies, such as Acterna (and formerly TTC), Hekemian Labs, Hewlett Packard, and others well known to those skilled in the art, provide logical test boxes, that is, physical test pads with logical cards, that enable users to gain physical access to the circuit with the test pad and determine what is occurring at the logical level of the circuit using the logical card. A logical test box is physically connected to a circuit either through direct connection (i.e., the logical test box is placed in series with the physical circuit) or by using a digital cross-connect system (DCS) to gain access to the physical layer of the circuit. A DCS provides physical access to multiple circuits and is well known to those skilled in the art. Thus, in other words, existing methods of logical layer testing require connecting a logical test box everywhere that a physical circuit or digital cross-connect exists. This requires manual connection of the logical test box to the physical circuit in order to test the logical layer or gather logical layer information.

The price of a logical test box may be anywhere from $100,000 to $1,000,000. Typically, a logical test box only works with up to three digital cross-connects (DCSs). For example, the Atlanta metropolitan area, which is one local access transport area (LATA), includes approximately eighty DCSs, meaning that approximately twenty-five to thirty logical test boxes would be required for logical layer testing in the Atlanta LATA alone.

Accordingly, there is a need for methods and systems of obtaining logical layer information at a reduced cost to telecommunications service providers and without the use of numerous logical test boxes that require physical connection to a circuit.

SUMMARY OF THE INVENTION

The present invention provides systems and methods for obtaining logical layer information using a remote physical layer test system. In an exemplary embodiment, a physical layer test system, such as an integrated testing and analysis system (INTAS), communicates with a broadband network management system (BNMS), which in turn communicates with an element management system (EMS) for a frame relay and/or ATM network. The INTAS sends a first command message to the BNMS including information required for the BNMS to determine the appropriate instructions to send to the EMS, as well as other information such as identification of a circuit or endpoint. The BNMS generates a second command message and transmits the second command message to the EMS requesting that the EMS obtain certain logical layer information. The EMS performs certain actions, such as communicating with a switch within the network, based on the second command message received, and transmits one or more responses to the BNMS responsive to the second command message. The BNMS transmits results of the logical layer test to the INTAS, which may be accessed remotely by a user or analyst (human or automated), thus allowing the user or analyst to obtain logical layer information via the INTAS.

In certain exemplary embodiments, the INTAS and BNMS communicate using transaction language one (TL1) command messages. In certain exemplary embodiments, the BNMS and EMS communicate via command line interface (CLI) command messages. In certain exemplary embodiments, communications between the EMS and a switch or network element within the frame relay and/or ATM network are in the form of simplified network management protocol (SNMP) get and/or set commands. Various other types of communications languages may be used to transmit commands between the INTAS, the BNMS, the EMS, and the frame relay and/or ATM network.

The present invention allows for remote testing for logical layer information by placing an INTAS, a BNMS, and an EMS in communication in series. The present invention allows users or analysts to obtain logical layer information remotely using a physical layer test system, whereas previously obtaining logical layer information required human personnel physically testing each individual circuit using a logical test box connected to the circuit itself or a DCS providing physical access to multiple circuits. Methods and systems of the present invention allow for the use of a single logical test box connected to the frame relay and/or ATM network in each LATA. Accordingly, for example, rather than needing 25–30 boxes for the Atlanta LATA, only a single logical test box is needed, greatly reducing both the equipment and personnel costs associated with obtaining logical layer information.

DETAILED DESCRIPTION OF THE INVENTION

Figure 1:
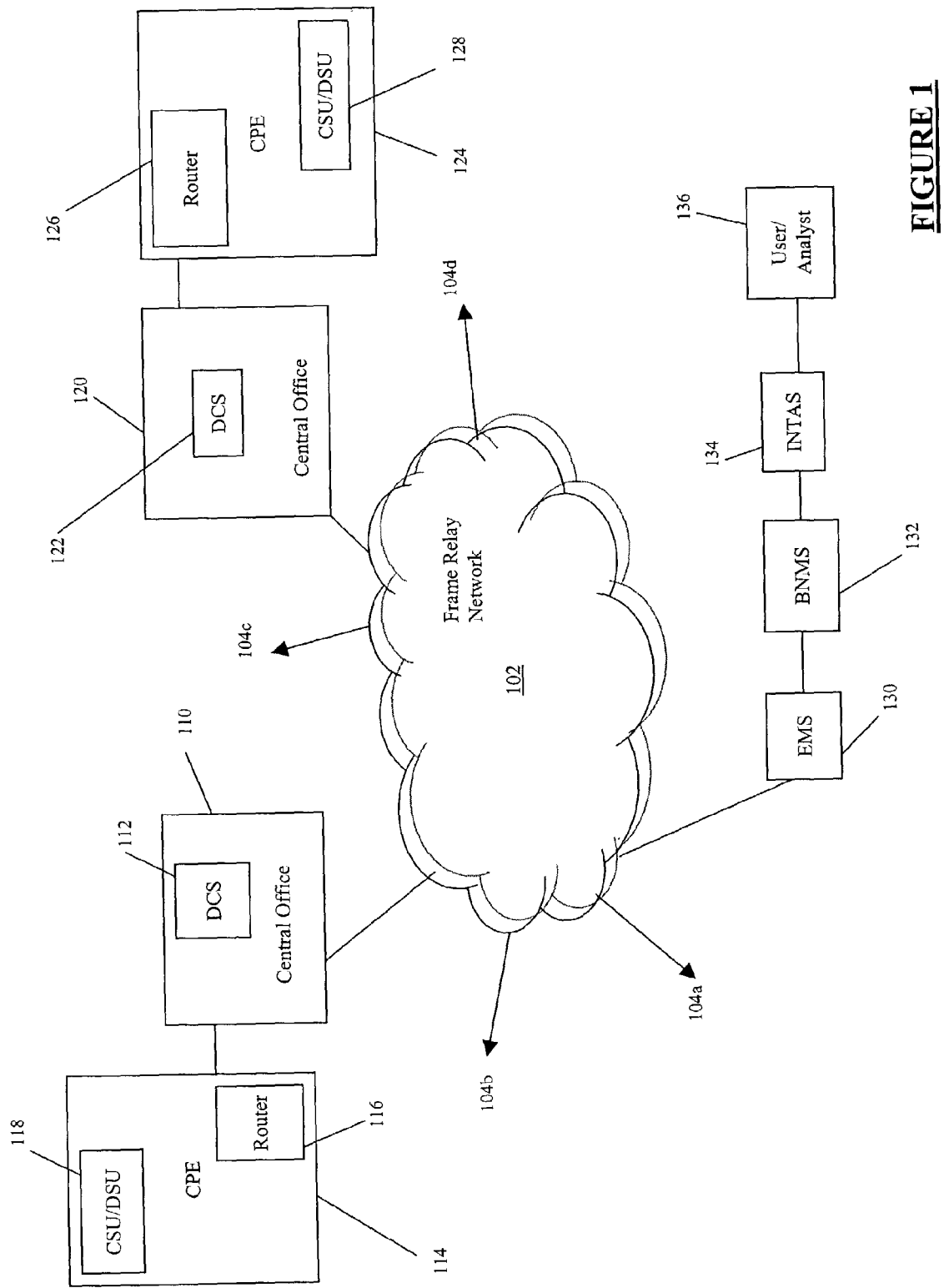
FIG. 1 is a block diagram of an exemplary environment for operation of certain exemplary embodiments of the present invention.

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
| --- | --- |
| ADSL | Asymmetric Digital Subscriber Line |
| ATM | Asynchronous Transfer Mode |
| BNMS | Broadband Network Management System |
| CAC | Connection Admission Control |
| CIR | Committed Information Rate |
| CLI | Command Line Interface |
| CMIP | Common Management Information Protocol |
| CPE | Customer Premises Equipment |

TABLE 1-continued

| ACRONYM | DEFINITION |
| --- | --- |
| CSU/DSU | Channel Service Unit/Data Service Unit |
| DCS | Digital Cross-Connect |
| DLCI | Data Link Connection Identifier |
| DSLAM | Digital Subscriber Line Access Multiplexer |
| EMS | Element Management System |
| FRAD | Frame Relay Access Device |
| GUI | Graphical User Interface |
| HDSL | High-speed Digital Subscriber Line |
| HLU | HDSL Line Unit |
| HRU | HDSL Remote Unit |
| INTAS | Integrated Testing and Analysis System |
| IP | Internet Protocol |
| LATA | Local Access Transport Area |
| LMI | Link Management Interface |
| NIU | Network Interface Unit |
| NNI | Network-to-Network Interface |
| NSDB | Network Services Database |
| OSI | Open Systems Interconnection |
| PC | Personal Computer |
| POTS | Plain Old Telephone Service |
| PVC | Permanent Virtual Circuit |
| QOS | Quality of Service |
| RBOC | Regional Bell Operating Company |
| RDBMS | Relational Database Management System |
| SMDS | Switched Multimegabit Data Service |
| SNMP | Simplified Network Management Protocol |
| SVC | Switched Virtual Circuit |
| TCP/IP | Transmission Control Protocol/Internet Protocol |
| TL1 | Transaction Language One |
| WFA | Work Force Administration |

Embodiments of the present invention provide systems and methods for obtaining logical layer information in a frame relay and/or ATM network. In an exemplary embodiment, a physical layer test system, such as an integrated testing and analysis system (INTAS), communicates with a broadband network management system (BNMS), which in turn communicates with an element management system (EMS) for a frame relay and/or ATM network. The INTAS sends a first command message to the BNMS including information required for the BNMS to determine the appropriate instructions to send to the EMS, as well as other information such as identification of a circuit or endpoint. The BNMS generates a second command message and transmits the second command message to the EMS requesting that the EMS obtain certain logical layer information. The EMS performs certain actions, such as communicating with a switch within the network, based on the second command message received, and transmits one or more responses to the BNMS responsive to the second command message. The BNMS transmits results of the logical layer test to the INTAS, which may be accessed remotely by a user or analyst (human or automated), thus allowing the user or analyst to obtain logical layer information via the INTAS.

In certain exemplary embodiments, the INTAS and BNMS communicate using transaction language one (TL1) command messages. In certain exemplary embodiments, the BNMS and EMS communicate via command line interface (CLI) command messages. In certain exemplary embodiments, communications between the EMS and a switch or network element within the frame relay and/or ATM network are in the form of simplified network management protocol (SNMP) get and/or set commands. Various other types of communications languages may be used to transmit commands between the INTAS, the BNMS, the EMS, and the frame relay and/or ATM network.

An integrated testing and analysis system, or INTAS, is a remote physical layer test system that provides for automated testing of network circuits and services on one system with a single platform and a common interface. The industry standard INTAS is produced by Telcordia™ Technologies, Inc. and is well known to those skilled in the art. It should be understood that any testing and analysis system similar to INTAS by Telcordia may be used in accordance with the principles of the present invention. Where INTAS is used in the specification and claims of this application, INTAS is not intended to be limited to only the INTAS by Telcordia, but rather includes the INTAS by Telcordia and other similar testing and analysis systems known to those skilled in the art.

An exemplary INTAS, more particularly the INTAS by Telcordia, supports both POTS/LOOP and Special Service circuits testing on a single platform, and for ADSL (asymmetric digital subscriber line) services, incorporates POTS/LOOP tests, Special Service-like tests, and DSLAM (digital subscriber line access multiplexer) performance and configuration data into its analysis. The INTAS gives testers a network-wide view of circuit diagrams, from their desktops, and the ability to apply built-in scripts for the diagnosis of complex circuits. When problems are detected, the INTAS determines what is wrong and sends a trouble report to the work force administration (WFA) or other requesting system. The well-defined open standard interfaces of the INTAS provide multi-vendor product flexibility. The INTAS runs on an HP-UX® hardware platform, and the web-enabled graphical user interface (GUI) runs on both PC and UNIX® workstations anywhere on the network, as well as from field-based laptops. The INTAS utilizes the industry standard Oracle® Relational Database Management System (RDBMS) for system configuration.

The INTAS communicates with different testheads, for example, the T3AS-DS1 testhead made by Acterna and the RMSD-DS0 and RMSD-DS1 testheads made by Lucent Technologies, which are well known to those skilled in the art. A testhead is a device that connects to a DCS and performs testing functions, as instructed by the INTAS. Communication of testheads with DCSs is well understood by those skilled in the art. Typically, the testhead sends a command to the DCS to map a circuit to the testhead, thus allowing the testhead access to physically test the circuit. Physical testing of the circuit may include, but is not limited to, measuring signal strength, looping various devices (e.g., HDSL line unit (HLU), HDSL remote units (HRU), network interface unit (NIU), etc.) inserting various signals, and determining whether a signal runs "clean" on a loop back to the testhead. Thus, generally stated, the testhead receives a request to test a circuit from the INTAS, performs the test according to the instructions received by communicating with a DCS, and sends test results back to the INTAS.

According to systems and methods of the present invention, the INTAS communicates with a broadband network management system, or BNMS, which is well understood by those skilled in the art. A BNMS provides operation, administration, maintenance, and provisioning for frame relay and/or ATM network elements. BNMS administrator workstations communicate with network elements via an OSI (Open Systems Interconnection)-based common management information protocol (CMIP) over TCP/IP (transmission control protocol/internet protocol). An exemplary BNMS is available from NEC Corporation of Japan, but it should be understood that any other BNMS known to those skilled in the art may be used in accordance with the principles of the present invention. Where BNMS is used in the specification and claims of this application, BNMS is not intended to be limited to the BNMS available from NEC Corporation, but rather includes all BNMSs that are known to those skilled in the art.

The BNMS communicates with an element management system, or EMS, according to systems and methods of the present invention. An EMS is a centralized service and network management application that delivers standards-based management of multi-service products, such as frame relay, switched multimegabit data service (SMDS), ATM, and internet protocol (IP) switch networks, on a single platform. NavisCore™, available from Lucent® Technologies, Inc., is an industry standard EMS that is well understood by those skilled in the art. Among other things, the NavisCore EMS speeds circuit provisioning with point-and-click operations to establish end-to-end network connectivity; uses a series of pull-down menus to provide logical provisioning of individual circuits and to establish network-wide parameters; allows for a variety of traps for alarm indications and statistics logging for all objects in a switch network, including switches, trunks, physical ports, logical ports, permanent virtual circuits (PVCs), and switched virtual circuits (SVCs); and uses network statistics for real-time status information on logical and physical ports. It should be understood that EMSs other than NavisCore that are known to those skilled in the art may also be used in accordance with the principles of the present invention. Where EMS is used in the specification and claims of this application, EMS is not intended to be limited to NavisCore, but rather includes NavisCore and all such other similar EMSs known to those skilled in the art.

The present invention allows for remote testing for logical layer information in a frame relay and/or ATM network by placing an INTAS, a BNMS, and an EMS in communication in series. FIG. 1 illustrates an exemplary environment for operation of certain exemplary embodiments of the present invention. A frame relay network 102 is shown in FIG. 1. Connected to network 102 are central offices 110 and 120. Located within central office 110 is a DCS 112. Likewise, located within central office 120 is a DCS 122. DCSs 112 and 122 are located within central offices 110 and 120, respectively, and provide physical access to multiple circuits at the central office location, as discussed above.

Customer premises equipment (CPE) 114 is connected to central office 110, and CPE 124 is connected to central office 120. CPE 114 includes a router 116 and a channel service unit/data service unit (CSU/DSU) 118. CPE 124 includes a router 126 and a CSU/DSU 128. CPE 114 and 124 may also include client access devices, such as personal computers, telephones, facsimile machines, and the like. Routers, such as router 116 and 126 shown in FIG. 1, provide intelligent routing of information between dissimilar networks. Other devices, such as a switch, may be utilized instead of a router.

In order to access the Internet, additional customer premises equipment, central offices, or other external facilities, routers 116 and 126 are linked to CSU/DSUs 118 and 128, respectively. Typically, conventional routers are linked to a CSU/DSU by connecting the router's V.35 port to the CSU/DSU with a cable. CSU/DSUs 118 and 128 act as termination points for a digital channel, performing various functions such as line conditioning and equalization between the incoming channel and various other network elements. In the embodiment shown, a CSU/DSU allows a customer to connect (through a central office) via a virtual circuit, such as a PVC or SVC (not shown), to other facilities through frame relay network 102. In other embodiments, the customer connects through an ATM network (not shown) or a combination of frame relay, ATM, and/or other network types. For example, frame relay service providers often internetwork ATM backbones and frame relay networks to provide the most cost-efficient and effective network offering to their customers. Examples of other facilities that customers or a central office may access via a CSU/DSU include remote customer locations, supplier networks, and the Internet. Also shown in FIG. 1 are arrows 104a, 104b, 104c, and 104d. These arrows are present to illustrate that a variety of additional equipment or facilities, such as other central offices, CPE, the Internet, routers, and the like, may be connected to the facilities and equipment shown in FIG. 1 via frame relay network 102.

Frame relay is a conventional protocol for establishing a packet-switching network. A frame relay network, such as network 102, includes various network equipment, including switches, network routers, and multiplexers. These devices forward frames received by the frame relay network 102 to frame relay access devices (FRAD), such as CSU/DSU 118 or 128.

Frame relay uses variable sized packets called frames. The frames are statistically multiplexed. The OSI Reference model describes an architecture consisting of seven layers. Layer 1 is the physical layer and consists of the physical network elements and connections. Layer 2 is the data link layer and includes technology-specific transfer elements. Layer 3 is the network layer and includes routing and relaying. Layer 4 is the transport layer and includes elements necessary for reliable data transfer. Layer 5 is the session layer and is responsible for dialog coordination. Layer 6 is the presentation layer and provides a mechanism for implementing syntax. Layer 7 is the application layer and includes semantics.

Frame relay eliminates most OSI layer 2 functionality. Frame relay does not "route" per se—it only forwards and forgets. For example, although a frame relay network checks for error-free frames, the frame relay network makes no attempt to retransmit dropped frames. Because of the simplification, the throughput of a frame relay network is drastically increased and implementation is simplified (and its expense limited). A frame relay network provides a wide area network that is separate from the physical network.

A frame relay network generally includes independent switches that are networked together. A frame relay network is not only fast and efficient; it is also flexible. Any protocol can be encapsulated and transmitted, and the frame relay network assumes no responsibility for protocol conversion. The conversions occur outside the network, which helps to make the frame relay network faster and less expensive to implement. The frame relay network includes no error detection, and there is no attempt to resend lost frames. The basic rule in frame relay networking is that if any problems exist in relation to a frame or in the network, the frame is discarded. The problems may include errors, such as data errors and network congestion. This approach to error handling, dropping frames in response to errors, is successful because frame relay facilities are fully digital, which decreases the chances of losing or corrupting frames. Frame relay networks are optimized for data, i.e., bursty communication, but have also been implemented successfully for compressed voice and video.

Frames in a frame relay network 102 include a header and trailer. Included in the header is the data link connection identifier (DLCI). The DLCI identifies a particular destination end-point within the frame relay network, helping to further simplify routing through the frame relay network. When a frame arrives at a switch, the switch checks a routing table. If the DLCI exists in the routing table, the switch forwards the frame towards the destination, and if the DLCI does not exist, the switch discards the frame.

Asynchronous transfer mode (ATM) is a conventional protocol for establishing a packet-switching network. An ATM network includes various network equipment, including switches and multiplexers. In contrast to frame relay, ATM utilizes fixed-size packets called cells. ATM is sometimes referred to as a cell-switching protocol. The ATM cell includes a 48-byte (8 bit byte) payload and a five-byte header.

ATM provides high performance. This high performance is due to a number of factors. First, ATM combines multiplexing and switching within ATM switches. ATM switches use the virtual path and virtual channel identifiers within the ATM cell header to determine how to switch individual cells. Also, the relatively small, fixed-size cells provide efficient packaging of bursty traffic, such as data, voice, and video. The smaller, time-critical bits of information do not sit idle, waiting for large data packets to be packaged and transmitted.

ATM also provides various methods of optimizing network efficiency and for providing specified quality-of-service (QOS) levels, unlike frame relay (which specifies QOS at the interface). At the hardware level, a network administrator can create multiple queues and multiple virtual circuits to support the variety of data types traversing the network. These queues and virtual circuits may vary by acceptable loss and delay rates, queuing rules, and flow controls, depending on the traffic projected to flow through them. An ATM network administrator may also implement controls at the network level. These controls include connection admission control (CAC) and routing and rerouting systems.

Communication through ATM and frame relay networks, such as frame relay network 102, occurs within a logical path called a virtual circuit. The virtual circuit may be a permanent or switched virtual circuit. For example, typically a CSU/DSU, such as CSU/DSU 118 or 128, is connected to a PVC. The actual physical path taken through frame relay network 102 may vary from communication to communication. The PVC may connect two endpoints, such as CPE 114 and CPE 124. Each end point corresponds to a DLCI. Communication between CPE 114 and CPE 124 is bi-directional across the PVC.

Data received or transmitted by CSU/DSU 118 or 128 is received or transmitted on ports. A network device, such as CSU/DSU 118 or 128 or router 116 or 126, has physical ports. A physical port is a physical interface between a device and a circuit, such as a socket to accept a network cable. The port may be analog or digital and either electrical or optical. A network device may also have logical ports, which are logical as opposed to physical points of connection between a device and a circuit. By providing logical ports, a network device can support multiple logical connections over a single physical connection.

Also connected to network 102 is an EMS 130. EMS 130 is connected to a BNMS 132, which in turn is connected to an INTAS 134. INTAS 134 may be accessed by a user or human or automated analyst 136. An exemplary EMS, BNMS, and INTAS were described in detail above. According to certain exemplary embodiments of the invention explained further below, INTAS 134 sends a first command message to BNMS 132. BNMS 132 generates a second command message and transmits the second command message to EMS 130 requesting that EMS 130 obtain certain logical layer information. EMS 130 may communicate with switches or other network elements within the network, perform certain actions based on the second command message, and obtain the sought after logical layer information within network 102. EMS 130 transmits one or more responses to BNMS 132. BNMS 132 transmits results of the logical layer test performed to INTAS 134 which may be accessed remotely by user/analyst 136. This allows user/analyst 136 to remotely obtain logical layer information via INTAS 134, which is a remote physical layer test system, rather than having to physically travel to a customer site or a central office, such as central office 110, and connect a logical layer test box to DCS 112 to obtain logical layer information.

Figure 2:
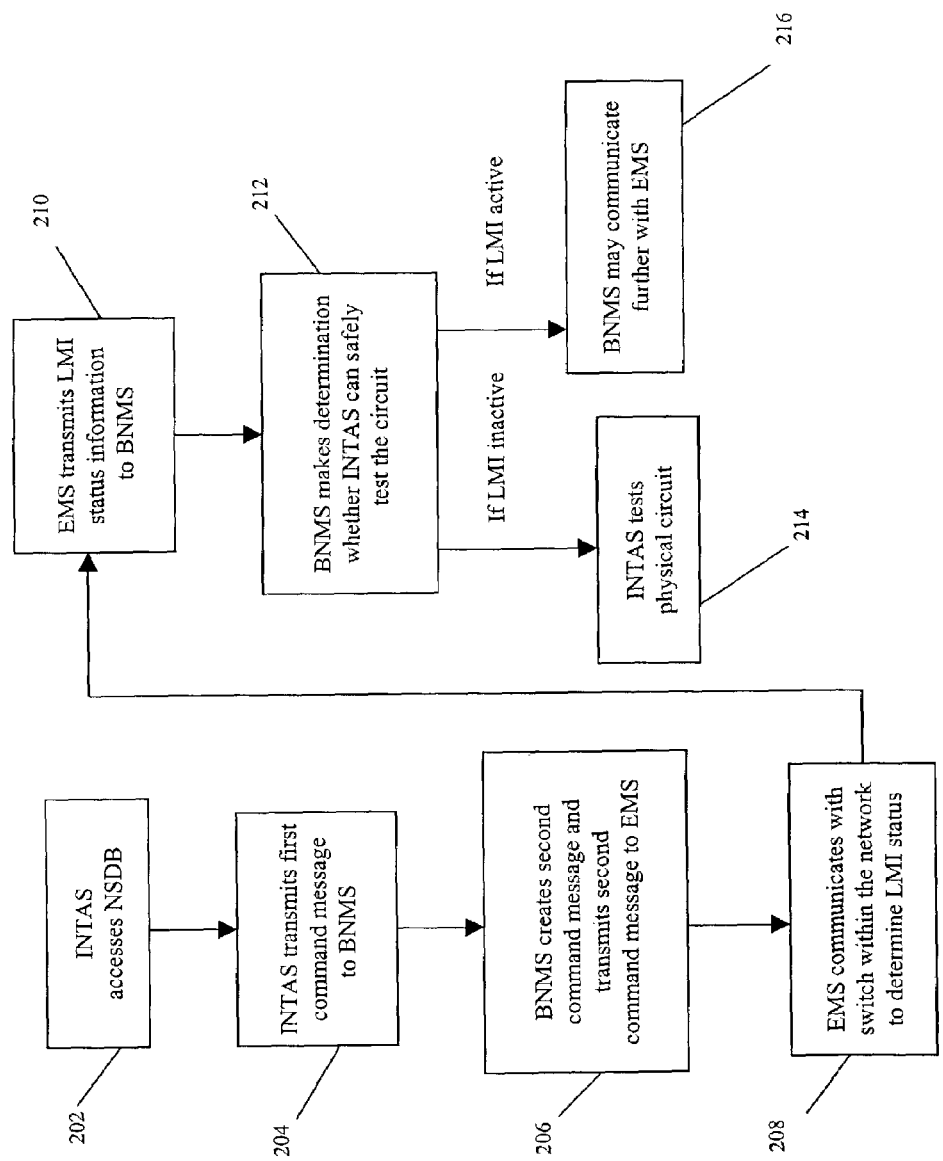
FIG. 2 is a flow diagram of a method for retrieving LMI status of a logical port according to an exemplary embodiment of the present invention.
Figure 3:
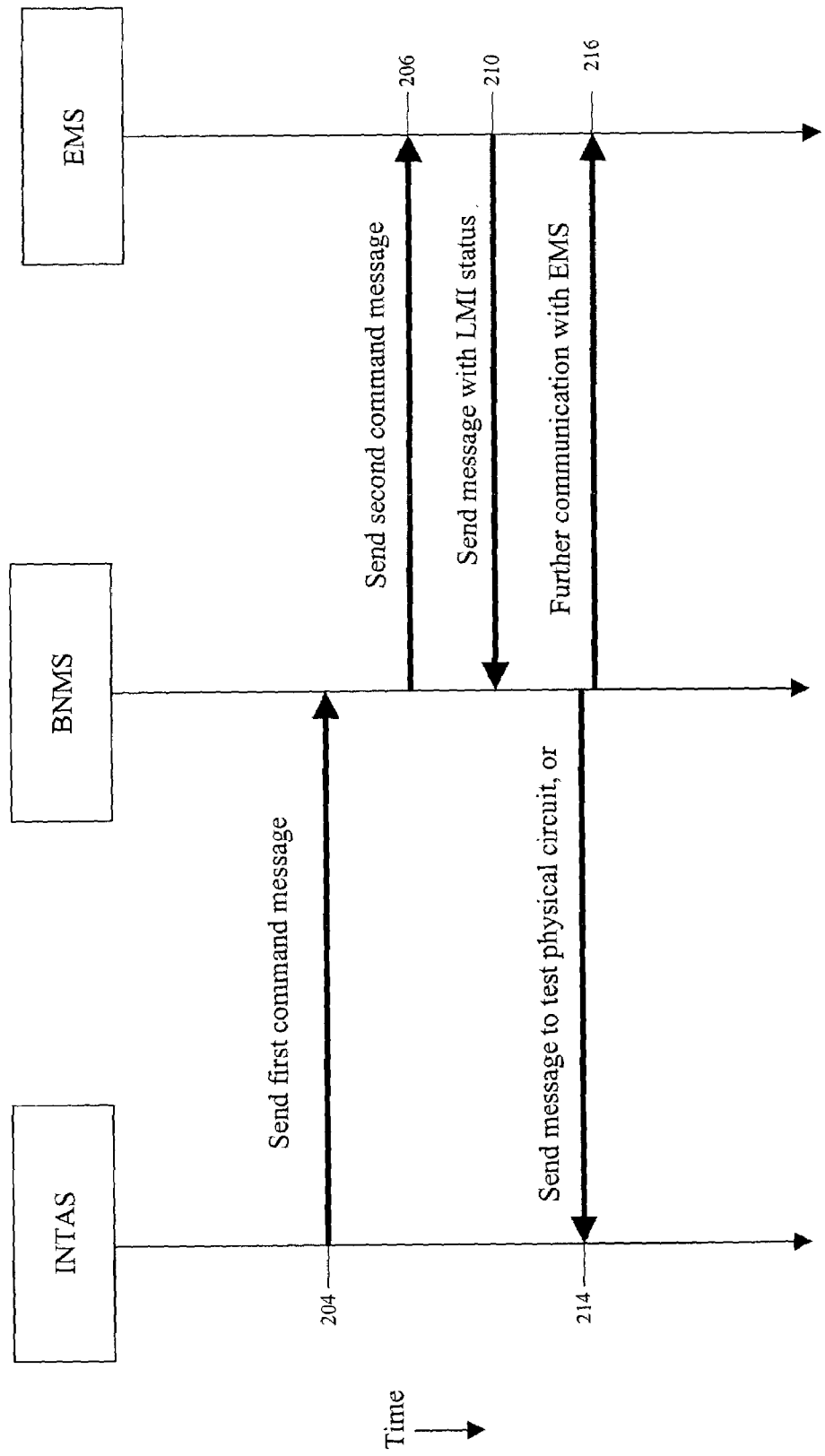
FIG. 3 is a timing diagram of the information flow between the INTAS, BNMS, and EMS according to the embodiment shown in FIG. 2.
Figure 4:
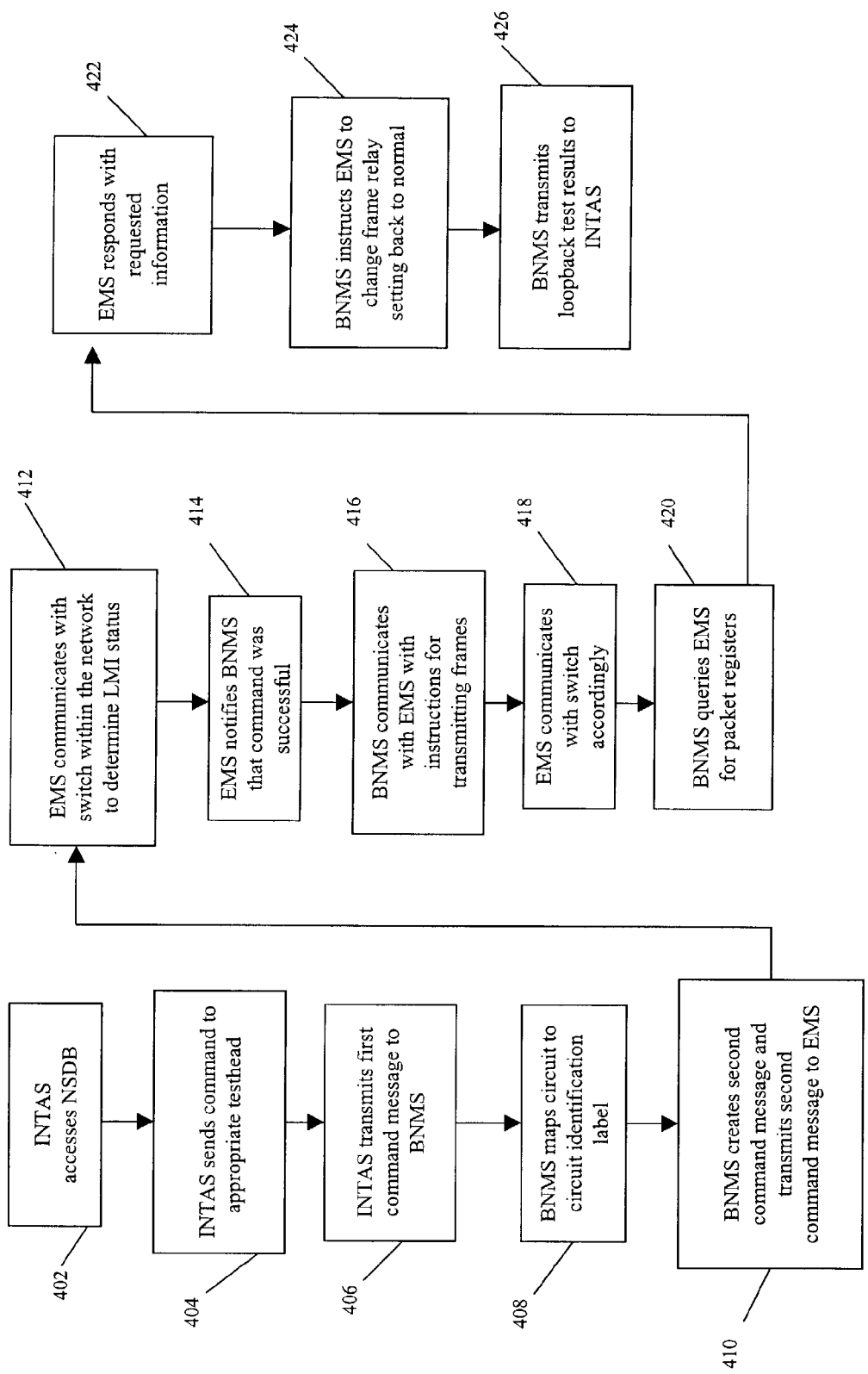
FIG. 4 is a flow diagram of a method for performing a logical loopback test according to an exemplary embodiment of the present invention.
Figure 5:
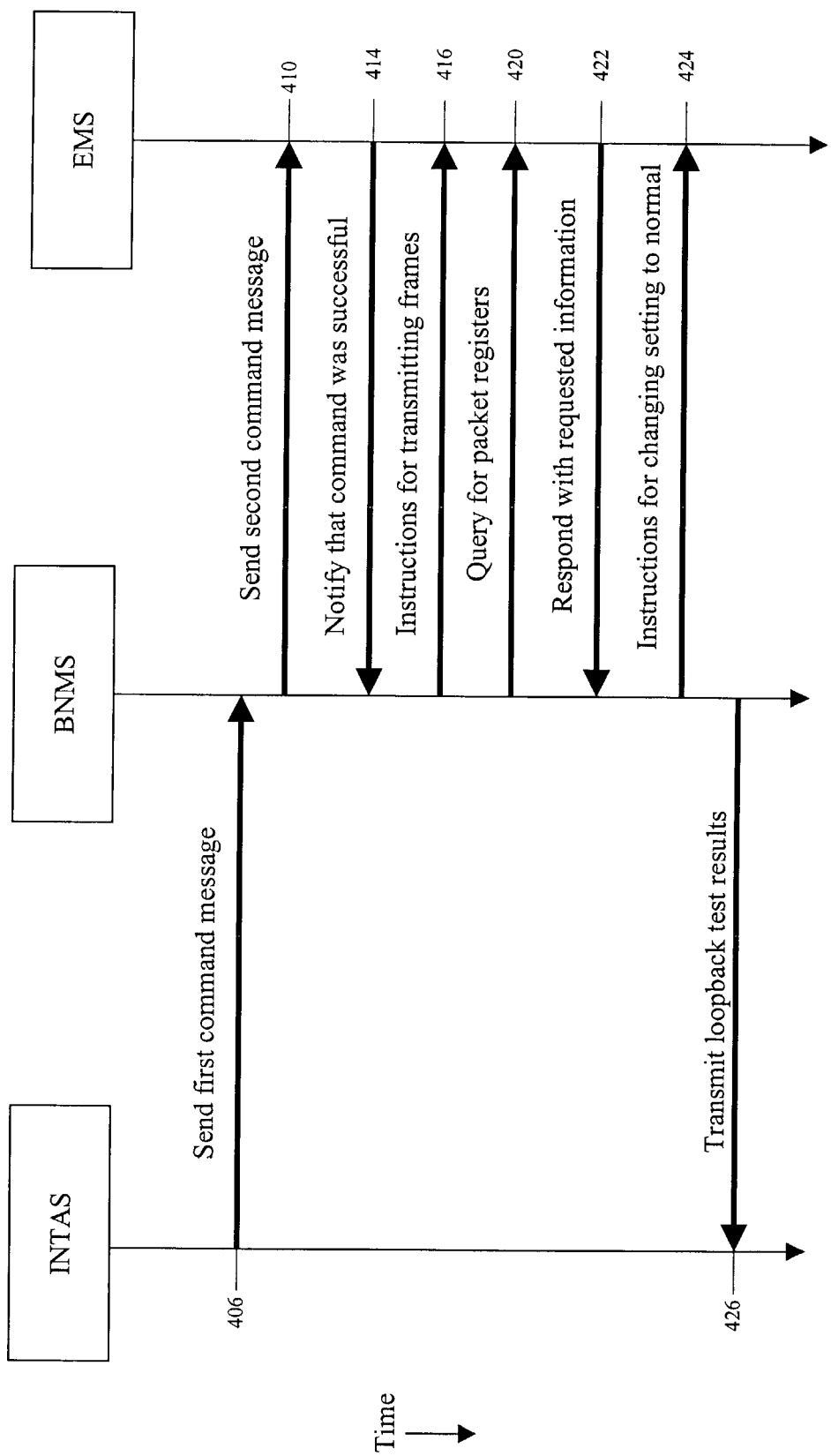
FIG. 5 is a timing diagram of the information flow between the INTAS, BNMS, and EMS according to the embodiment shown in FIG. 4.
Figure 6:
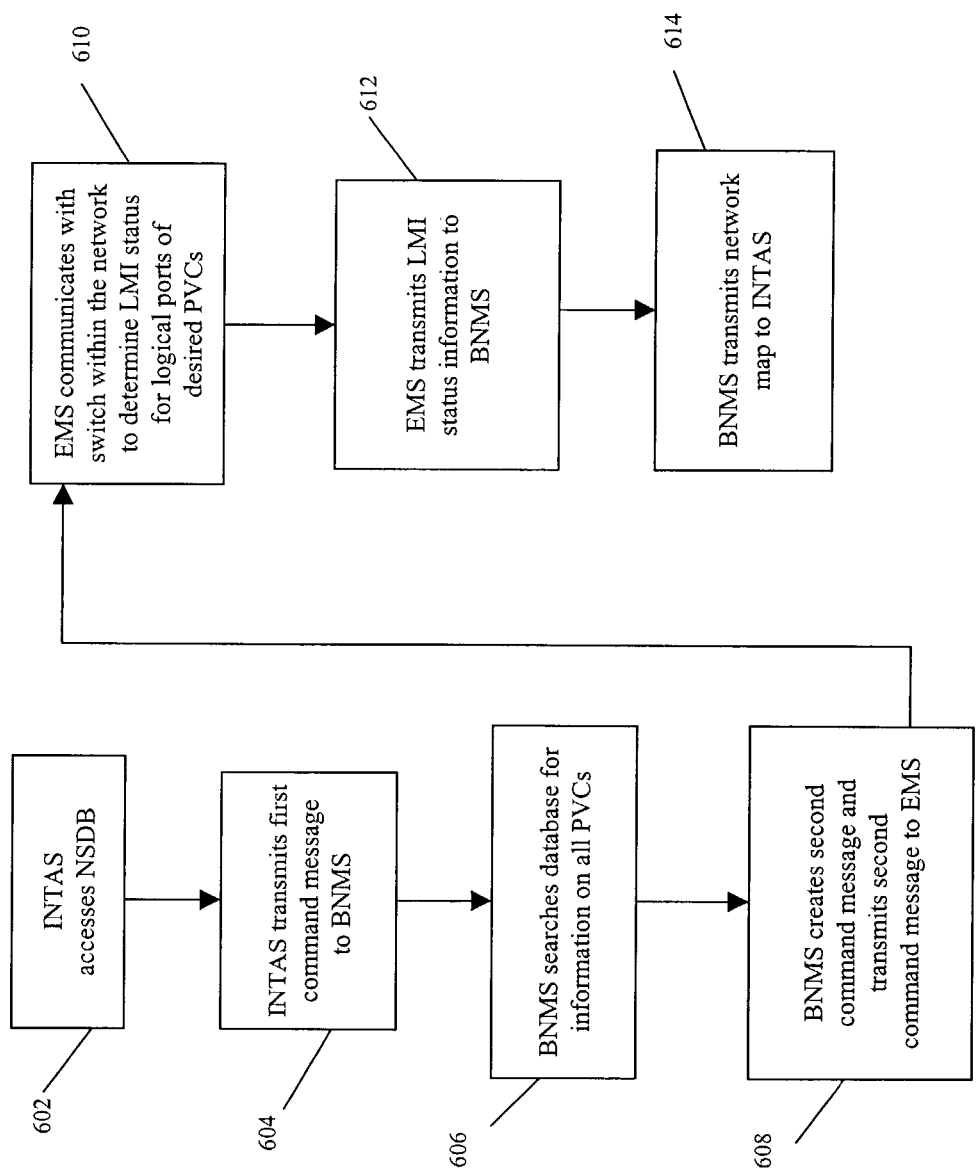
FIG. 6 is a flow diagram of a method for obtaining a map of a frame relay or ATM network according to an exemplary embodiment of the present invention.
Figure 7:
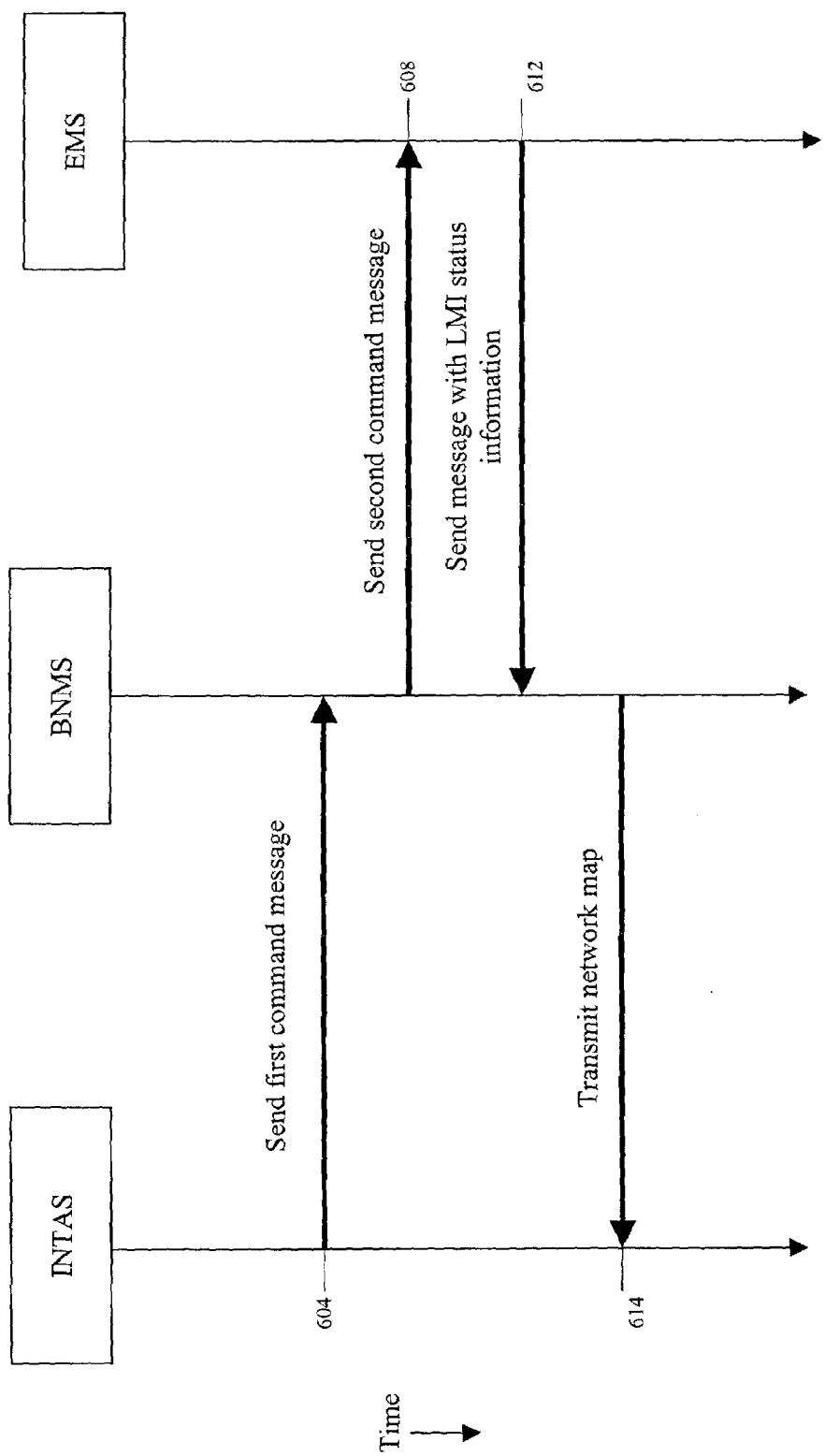
FIG. 7 is a timing diagram of the information flow between the INTAS, BNMS, and EMS according to the embodiment shown in FIG. 6.
Figure 8:
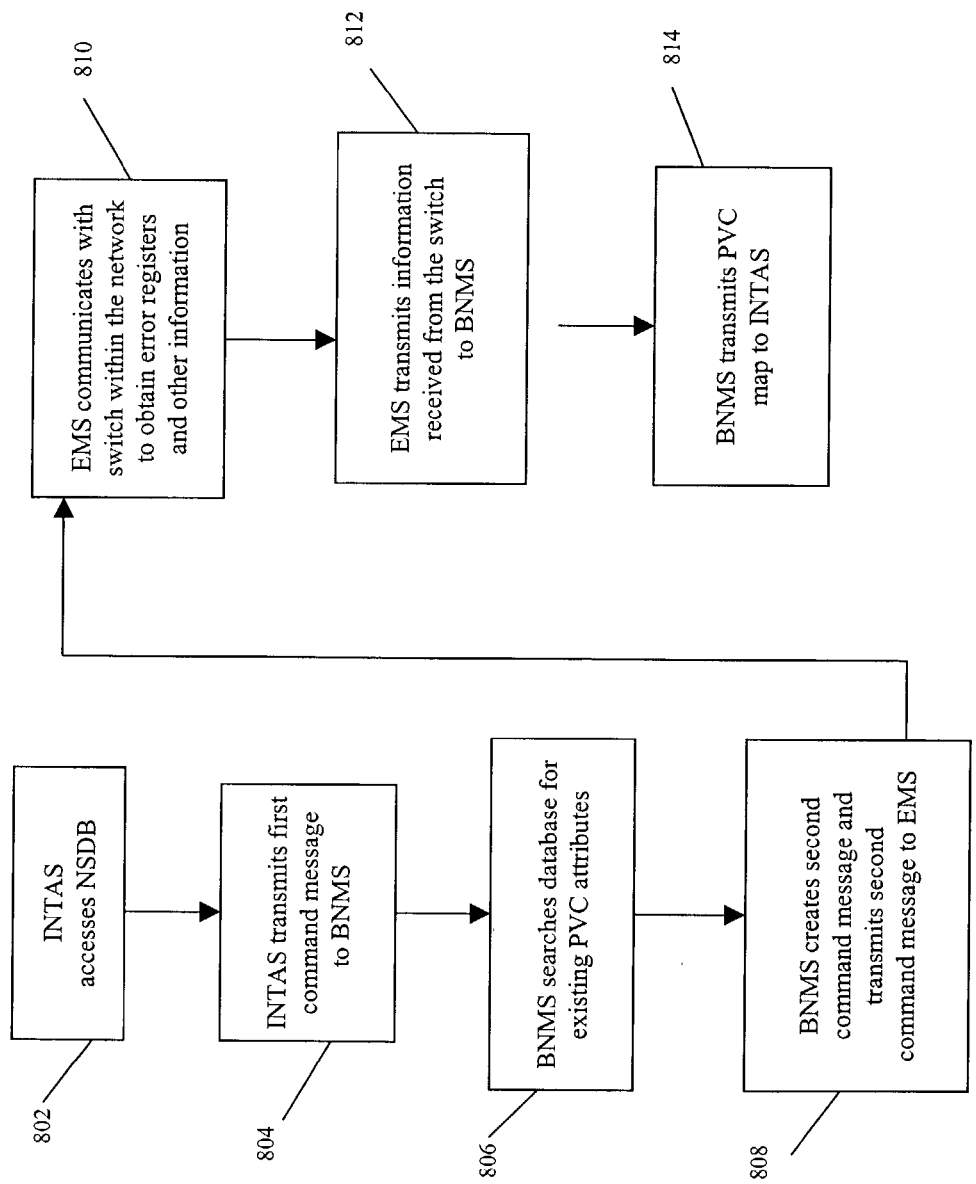
FIG. 8 is a flow diagram of a method for obtaining a map of a permanent virtual circuit according to an exemplary embodiment of the present invention.
Figure 9:
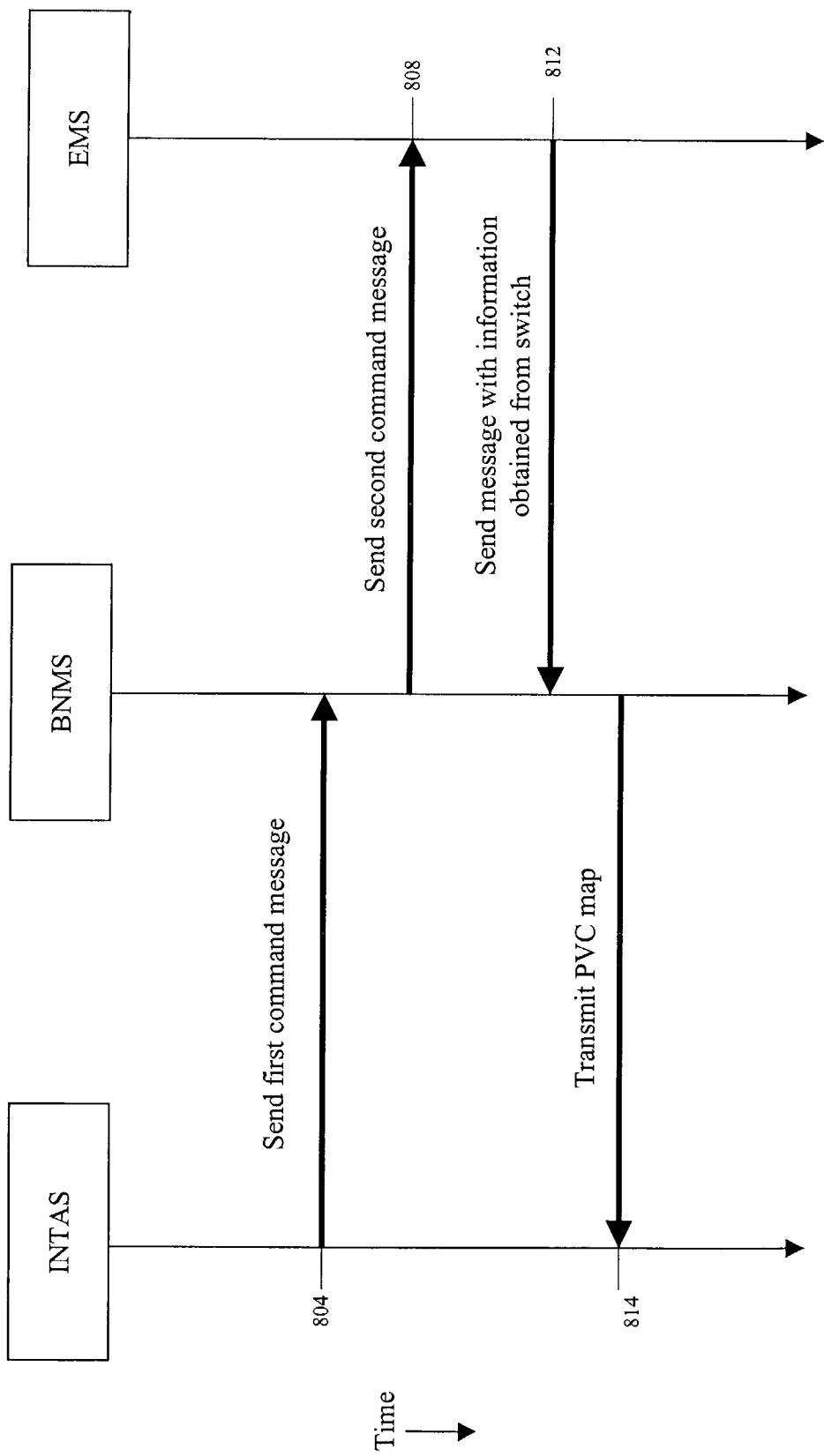
FIG. 9 is a timing diagram of the information flow between the INTAS, BNMS, and EMS according to the embodiment shown in FIG. 8.

Several exemplary embodiments according to the present invention are shown in FIGS. 2–9. FIGS. 2 and 3 illustrate a method for retrieving LMI status of a logical port. FIGS. 4 and 5 illustrate a method for performing a logical loopback test. FIGS. 6 and 7 depict a method for obtaining a map of a frame relay or ATM network. Finally, FIGS. 8 and 9 show a method for obtaining a map of a permanent virtual circuit.

FIG. 2 illustrates process flow for retrieving link management interface (LMI) status of a logical port in a frame relay network according to an exemplary embodiment of the present invention. Telecommunications providers are often interested in determining the LMI status of a logical port when a trouble ticket is received by the WFA indicating an assumed physical layer problem with a circuit to which the logical port may be connected. Accordingly, a user or analyst may access an INTAS for a given circuit. At block 202, the INTAS accesses a network services database (NSDB), which is well known to those skilled in the art, to obtain the necessary information to build the physical circuit.

The INTAS transmits a first command message to a BNMS, block 204. The first command message to the BNMS includes information required for the BNMS to determine the appropriate instructions to send an EMS, as well as identifying the logical port for which the LMI status is to be checked and the circuit to which the logical port is connected. The BNMS creates a second command message and transmits the second command message to the EMS, block 206. The second command message includes logical port information, circuit and physical port information, as well as other PVC information. This information enables the EMS to determine the proper logical port for which to check LMI status.

The EMS receives the second command message and communicates with a switch within the network to determine LMI status for a logical port, block 208. If LMI status is down or inactive, no data is able to be transmitted over the tested port. The EMS transmits the LMI status information to the BNMS, block 210. The BNMS makes a determination whether the INTAS can safely test the physical circuit, block 212. In other words, if the LMI status is inactive (or down) at the logical port, then the INTAS may test the physical circuit. If so, the BNMS instructs the INTAS to test the physical circuit, block 214. If the LMI status at the logical port is active (or up), the BNMS may communicate further with the EMS, block 216, for example, to determine what other circuit or port the reported failure may be associated with rather than the reported physical circuit. Once the INTAS receives instructions for testing the physical circuit from the BNMS, a user or analyst may easily access the INTAS to obtain the LMI status and related information or to assist in any testing or further determination of where the problem is within the circuit or network.

In certain exemplary embodiments, the BNMS and EMS communicate via CLI command messages. In certain exemplary embodiments, communications between the EMS and a switch or network element within the frame relay network are in the form of SNMP get and/or set commands.

In certain exemplary embodiments, the INTAS and BNMS communicate using TL1 command messages. TL1 is a vendor-independent telecom management protocol implemented in optical, broadband, and network access devices used in North America, other than circuit switches. TL1 is an ASCII or man-machine management protocol, i.e., a person can understand the commands. TL1 supports a standard command-line interface and also supports machine-to-machine communications. TL1 also provides the capability to define user-specific extensions. A TL1 command includes a number of elements, including (1) a command code, (2) a target identifier, (3) an access identifier, (4) a correlation tag, (5) a general block, and (6) a message payload block. Not all elements are required in any one command.

FIG. 3 illustrates a timing diagram of information flow between the INTAS, the BNMS, and the EMS in the embodiment of the present invention shown in FIG. 2. The INTAS sends a first command message to the BNMS, 204. As noted above, the first command message from the INTAS to the BNMS includes information required for the BNMS to determine appropriate instructions to send to the EMS and identifies the logical port for which LMI status is to be determined. Once the BNMS receives the first command message, the BNMS generates a second command message and transmits the second command message to the EMS, 206. The BNMS awaits a response from the EMS.

After the LMI status has been determined, the EMS sends a message to the BNMS with the LMI status information, 210. At 214, the BNMS instructs the INTAS to physically test the circuit if the BNMS has determined that the INTAS may safely do so (i.e., LMI status is inactive). At this point, a user or analyst may access the INTAS to view the LMI status information and to assist with any type of additional or further steps that need to be taken to eliminate or determine a problem or potential problem within the network, such as replacing a particular switch or modifying parameters of a PVC. If the BNMS has determined that it is not safe for the INTAS to test the physical circuit (i.e., LMI status is active), the BNMS may engage in further communications with the EMS, 216, as discussed above.

FIG. 4 illustrates process flow for performing a logical/layer 2 loopback test for a circuit in a frame relay network according to an exemplary embodiment of the present invention. A user or analyst may access an INTAS for a given circuit and request that the INTAS loop a given network element in order to perform a logical loopback test. At block 402, the INTAS accesses an NSDB to obtain the physical circuit information necessary to build the circuit. The INTAS sends a command to the appropriate test head, which in turn communicates with a network element and sends a signal to create a physical loop from the network element back to the switch, block 404. It should be noted that this physical loop is not limited to being located within the network, but may also connect with customer premises equipment (CPE).

The INTAS transmits a first command message to a BNMS to begin a logical loopback test, block 406. The first command message to the BNMS includes information required for the BNMS to determine the appropriate instructions to send to an EMS, as well as identifying a circuit for which the logical loopback test is to be performed. The BNMS maps the given circuit to a circuit identification label recognizable by the EMS, block 408, and the BNMS creates a second command message for transmission to the EMS, block 410. The second command message includes information identifying the circuit and instructs the EMS to set the given circuit to a specified state such that a switch within the network sets up to connect back to itself. At block 412, the EMS communicates with the switch in order to make the changes as instructed by the BNMS and, at block 414, notifies the BNMS that the command is successful.

At block 416, the BNMS communicates with the EMS with instructions that the frame relay switch begin transmitting LMI status frames on the circuit, which is now looped, and the EMS communicates with the switch accordingly, block 418. For every packet sent, if a corresponding packet is returned, it is known that the physical layer is acceptable and the logical layer must be the problem. The BNMS then queries the EMS for sent and received registers for the packets, typically more than once (not shown) to ensure that the frame relay switch is receiving one packet for each packet sent, block 420. At block 422, the EMS responds with the requested information. Once the BNMS has sufficient data to make a loopback determination (e.g., positive or negative), the BNMS instructs the EMS to change the frame relay setting back to a normal state, block 424, where a normal state is how the switch was set before running the logical loopback test. The BNMS transmits the loopback test results to the INTAS, block 426, where a user or analyst can easily access such information.

In certain exemplary embodiments, the BNMS and EMS communicate via CLI command messages. In certain exemplary embodiments, communications between the EMS and a switch or network element within the frame relay network are in the form of SNMP get and/or set commands. In certain exemplary embodiments, the INTAS and BNMS communicate using TL1 command messages.

FIG. 5 illustrates a timing diagram of information flow between the INTAS, the BNMS, and the EMS in the embodiment of the present invention shown in FIG. 4. The INTAS sends a first command message to the BNMS, 406. As noted above, the command message to the BNMS includes information required for the BNMS to determine the appropriate instructions to send to an EMS, as well as identifying a circuit for which the logical loopback test is to be performed. Once the BNMS receives this message and maps the circuit to a circuit identification label recognizable by the EMS, the BNMS generates a second command message and transmits the second command message to the EMS, 410.

After communicating with the frame relay switch, the EMS notifies the BNMS that the switch has been set as requested, 414. The BNMS communicates with the EMS with instructions for the frame relay switch, 416. After allowing for transmission of LMI status frames and some initial results, the BNMS queries the EMS for sent and received registers for the packets transmitted in the circuit loop, 420. Typically, the BNMS may query the EMS in such a manner more than once (not shown). The EMS responds to the BNMS by supplying the requested information, 422. Once the BNMS has sufficient data to make a loopback determination, the BNMS instructs the EMS to change the frame relay setting back to a normal state, 424. At 426, the BNMS sends the loopback test results to the INTAS, where such information is available to the analyst.

FIG. 6 illustrates process flow for obtaining a map of a frame relay or ATM network according to an exemplary embodiment of the present invention. A user or analyst may desire to view or obtain a network map, for example, to see a customer's overall network or in an attempt to identify a problem circuit if a reported problem has misidentified the circuit where the problem is believed to reside. At block 602, an INTAS accesses an NSDB to obtain the physical circuit information necessary to build the circuit. At the prompting of a user or analyst, the INTAS transmits a first command message to the BNMS, block 604. The first command message to the BNMS includes information required for obtaining the network map and for the BNMS to determine appropriate instructions to send to an EMS for the network. The BNMS identifies all of the PVCs connected to a given circuit, block 606, by searching its own database. At block 608, the BNMS generates and transmits a second command message to the EMS for the network to obtain the LMI status of logical ports for certain desired PVCs, for example the far-end or most distant PVCs connected to the given circuit.

At block 610, the EMS communicates with a switch within the network to determine the LMI status for the logical ports of the desired PVCs. The EMS returns the LMI status information to the BNMS, block 612, and the BNMS transmits the network map, including information on the identified PVCs and the LMI status information for the logical ports of the desired PVCs, to the INTAS, block 614, where a user or analyst can easily access such information. Optionally (not shown), if the network map indicates that a problem exists in the network (e.g., a permanent virtual circuit from point A to point B is down), the INTAS may generate a follow up command message to the BNMS requesting a network map from another perspective. Follow up queries may continue until the origin of the problem in the network has been determined.

In certain exemplary embodiments, the BNMS and EMS communicate via CLI command messages. In certain exemplary embodiments, communications between the EMS and a switch or network element within the frame relay network are in the form of SNMP get and/or set commands. In certain exemplary embodiments, the INTAS and BNMS communicate using TL1 command messages.

FIG. 7 illustrates a timing diagram of information flow between the INTAS, the BNMS, and the EMS in the embodiment of the present invention shown in FIG. 6. The INTAS sends a first command message to the BNMS, 604. As noted above, the first command message to the BNMS includes information required for obtaining the network map and for the BNMS to determine appropriate instructions to send to an EMS for the network. Once the BNMS receives this message, the BNMS generates a second command message and transmits the command message to the EMS, 608.

After LMI status for the logical ports of the desired PVCs is obtained, the EMS sends a message to the BNMS with the LMI status information, 612. At 614, the BNMS forwards the network map, including information on the identified PVCs and LMI status information for the logical ports of the desired PVCs, to the INTAS, where such information is available to the analyst. The analyst may then view the network map to make decisions regarding any type of steps that need to be taken to eliminate a problem or potential problem. As an example, if network map information indicates that a problem exists in the network (e.g., a permanent virtual circuit from point A to point B is down), the analyst may cause the INTAS to generate a follow up command message to the BNMS requesting a network map from another perspective (e.g., point B). Follow up queries may continue until the origin of the problem in the network has been determined.

FIG. 8 illustrates process flow for obtaining a map of a PVC in a frame relay or ATM network according to an exemplary embodiment of the present invention. A user or analyst may access an INTAS for a given circuit and request a PVC map, for example, in order to view all of the attributes of a PVC from the physical test system without having logical layer access to the physical circuit. At block 802, an INTAS accesses an NSDB to obtain the physical circuit information necessary to build the circuit. At the prompting of a user or analyst, the INTAS transmits a first command message to the BNMS, block 804. The command message to the BNMS includes information required for obtaining a PVC map and for the BNMS to determine appropriate instructions to send to an EMS for the network. Typically, a pull-down menu may be available to a user or human analyst to select from a group of PVCs at the INTAS. The BNMS identifies the attributes of the PVC that exist in its own database by searching the database, block 806. Such information generally includes DLCIs, committed information rate (CIR), burst committed, burst excess, and similar information that is well known to those skilled in the art.

At block 808, the BNMS transmits a second command message to an EMS for the network to obtain current registers for packet errors, data communication equipment errors, and similar information. The EMS communicates with a switch within the network to obtain such information, block 810. The EMS responds to the BNMS, block 812, by transmitting the requested PVC information to the BNMS. The BNMS forwards the network map, including both information from its own database and the information received from the EMS, to the INTAS, block 814, where a user or analyst can easily access such information.

In certain exemplary embodiments, the BNMS and EMS communicate via CLI command messages. In certain exemplary embodiments, communications between the EMS and a switch or network element within the frame relay network are in the form of SNMP get and/or set commands. In certain exemplary embodiments, the INTAS and BNMS communicate using TL1 command messages.

FIG. 9 illustrates a timing diagram of information flow between the INTAS, the BNMS, and the EMS in the embodiment of the present invention shown in FIG. 8. The INTAS sends a first command message to the BNMS, 804. As noted above, the message from the INTAS to the BNMS includes information required for obtaining a PVC map and for the BNMS to determine appropriate instructions to send to an EMS for the network. Once the BNMS receives this message, the BNMS generates a second command message and transmits the second command message to the EMS, 808.

After the requested PVC information is obtained from the network switch, the EMS sends a message to the BNMS with such requested PVC information, 812. At 814, the BNMS forwards the PVC map, including the requested PVC information obtained from the EMS and attributes of the PVC in the database of the BNMS, to the INTAS, where such information is available to the analyst. The analyst may then view the PVC map to make decisions regarding any type of steps that need to be taken to eliminate a problem or potential problem.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. In a system including an integrated testing and analysis system (INTAS), and an element management system (EMS) for a data network, a method for retrieving link management interface (LMI) status for a logical port in the data network, comprising:
   receiving at a broadband management system (BNMS) a first command message from the INTAS including information required for communicating with the EMS; and
   generating and sending a second command message from the BNMS to the EMS with instructions for communicating with a switch within the data network to obtain the LMI status of the logical port.

2. The method of claim 1, further comprising receiving the LMI status of the logical port from the EMS indicating whether the logical port is active or inactive, wherein the EMS receives the LMI status from the switch.

3. The method of claim 2, further comprising making a determination as to whether the INTAS can safely test a physical circuit that is connected via the logical port.

4. The method of claim 3, further comprising transmitting instructions to the INTAS for testing the physical circuit if the LMI status of the logical port is inactive.

5. The method of claim 3, further comprising further communicating with the EMS if the LMI status of the logical port is active.

6. The method of claim 1, wherein the first command message comprises a transaction language one (TL1) command message.

7. The method of claim 1, wherein the second command message comprises a command line interface (CLI) command message.

8. A system for retrieving link management interface (LMI) status for a logical port in a data network, comprising:
   an integrated testing and analysis system (INTAS) that transmits a first command message to a broadband management system (BNMS) including information required for communicating with an element management system (EMS) for the data network;
   the BNMS, which generates and sends a second command message to the EMS with instructions for communicating with a switch within the data network; and
   the EMS, which communicates with the switch to obtain the LMI status of the logical port.

9. The system of claim 8, wherein the EMS transmits the LMI status to the BNMS indicating whether the logical port is active or inactive.

10. The system of claim 9, wherein the BNMS determines whether the INTAS can safely test a physical circuit that is connected via the logical port.

11. The system of claim 10, wherein the BNMS transmits instructions to the INTAS for testing the physical circuit if the LMI status of the logical port is inactive.

12. The system of claim 10, wherein the BNMS further communicates with the EMS if the LMI status of the logical port is active.

13. The system of claim 8, wherein the first command message comprises a transaction language one (TL1) command message.

14. The system of claim 8, wherein the second command message comprises a command line interface (CLI) command message.

15. The system of claim 8, wherein the EMS and the switch of the data network communicate via simplified network management protocol (SNMP) commands.

16. A system for retrieving link management interface (LMI) status for a logical port in a data network, comprising:
- a testing means for transmitting a first command message including information required for communicating with an element management means for the data network;
- a network management means for receiving the first command message and generating and sending a second command message to the element management means with instructions for communicating with a switch within the data network; and
- the element management means for communicating with the switch to obtain the LMI status of the logical port, the element management means transmits the LMI status to the network management means indicating whether the logical port is active or inactive; and the network management means determines whether the testing means can safely test a physical circuit corresponding to the circuit.

17. The system of claim 16, wherein the network management means transmits instructions to the testing means for testing the physical circuit if the LMI status of the logical port is inactive.

18. The system of claim 16, wherein the network management means further communicates with the element management means if the LMI status for the logical port is active.

19. The system of claim 16, wherein the first command message comprises a transaction language one (TL1) command message, the second command message comprises a command line interface (CLI) command message, and the element management means and the switch of the data network communicate via simplified network management protocol (SNMP) commands.

20. A computer-readable medium including computer executable instructions which when executed by a computer perform a method for retrieving link management interface (LMI) status for a logical port in a data network, the method comprising:
- receiving at a broadband management system (BNMS) a first command message from an integrated testing and analysis system (INTAS) including information required for communicating with an element management system (EMS); and
- generating and sending a second command message from the BNMS to the EMS with instructions for communicating with a switch within the data network to obtain the LMI status of the logical port.

* * * * *